United States Patent [19]
Uchiyama

[11] Patent Number: 4,611,494
[45] Date of Patent: Sep. 16, 1986

[54] ULTRASONIC IMAGING APPARATUS USING DIGITAL CONTROL

[75] Inventor: Susumu Uchiyama, Ootawara, Japan

[73] Assignee: Kabushiki Kaisha Toshiba, Japan

[21] Appl. No.: 669,329

[22] Filed: Nov. 8, 1984

[30] Foreign Application Priority Data

Nov. 10, 1983 [JP] Japan ................... 58-211262

[51] Int. Cl.$^4$ ............................................. G01N 29/00
[52] U.S. Cl. ...................................... 73/626; 73/628; 128/660
[58] Field of Search ................ 73/626, 628, 625; 128/660

[56] References Cited

U.S. PATENT DOCUMENTS

| | | | |
|---|---|---|---|
| 4,234,940 | 11/1980 | Iinuma | 73/626 |
| 4,285,011 | 8/1981 | Sato | 73/626 |
| 4,372,323 | 2/1983 | Takemura et al. | 73/625 |
| 4,387,597 | 6/1983 | Brandestini | 73/626 |
| 4,392,379 | 7/1983 | Yamaguchi | 73/626 |
| 4,434,658 | 3/1984 | Miyazaki et al. | 73/626 |
| 4,470,305 | 9/1984 | O'Donnell | 73/626 |
| 4,472,973 | 9/1984 | Sugai et al. | 73/626 |

FOREIGN PATENT DOCUMENTS 53-10228  4/1978  Japan .
53-41946  7/1978  Japan .

*Primary Examiner*—Howard A. Birmiel
*Attorney, Agent, or Firm*—Finnegan, Henderson, Farabow, Garrett & Dunner

[57] ABSTRACT

In a transmitter section of ultrasonic imaging apparatus, a digital delay circuit is provided. The digital delay circuit includes a clock pulse selector for selecting one phase-shifted clock signal from the plurality of phase-shifted reference signal trains based upon delay time information of the control data signals of the timing control device, a clock counter for counting a pulse number of one phase-shifted clock signal derived from the clock pulse selector based upon the delay time information of the control data signals, thereby obtaining a digitally-delayed phase-shifted clock signal, and a wave number counter for counting a wave number of said digitally-delayed clock signal derived from said clock counter based upon wave number information of the control data signal, thereby finally obtaining a digitally-delayed phase-shifted signal having the desired wave number for the exciting phase.

4 Claims, 5 Drawing Figures

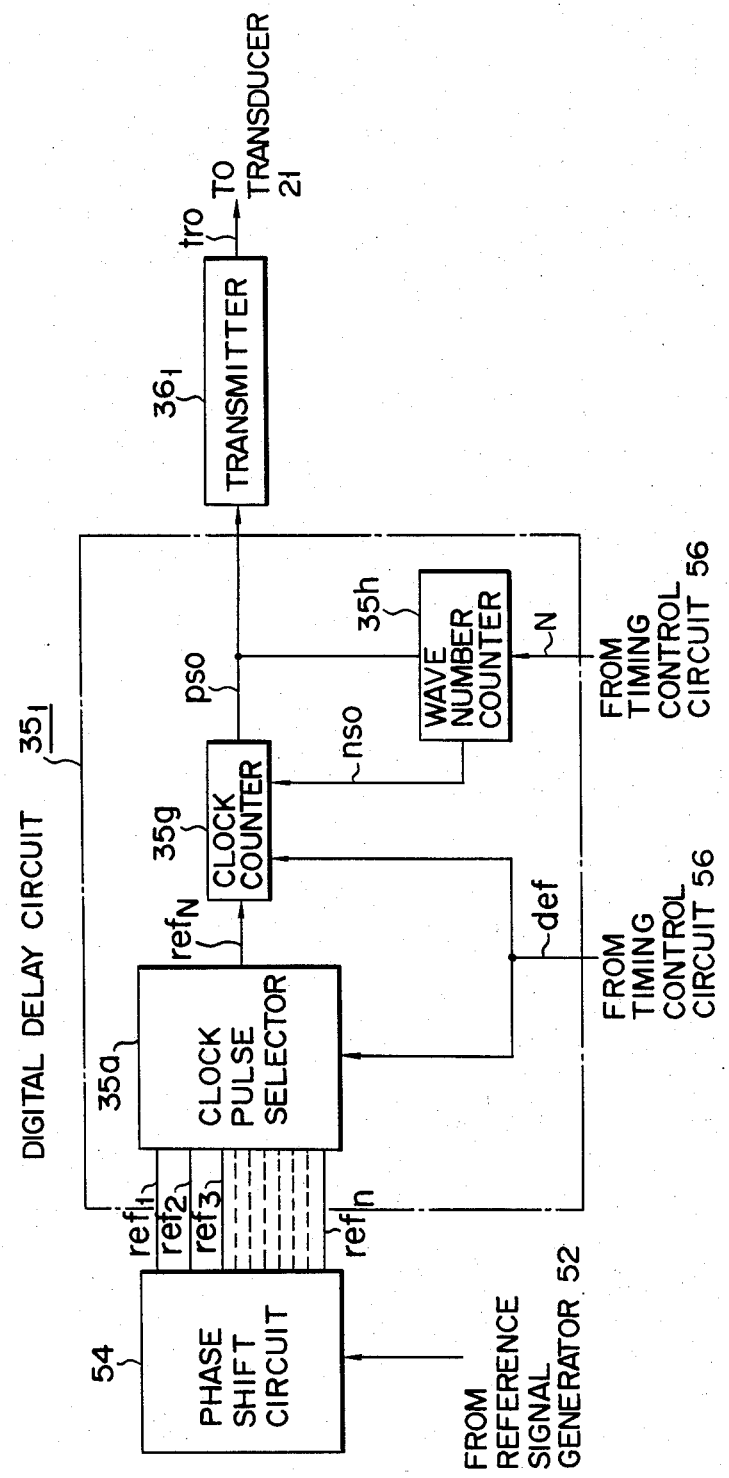
F I G. 5

ULTRASONIC IMAGING APPARATUS USING DIGITAL CONTROL

BACKGROUND OF THE INVENTION

1. Field of the Invention

The present invention relates to an ultrasonic imaging apparatus using a digital control technique.

2. Description of Prior Art

In an ultrasonic imaging apparatus, ultrasonic beams are generated by exciting a transducer array having a plurality of transducer elements, and are then transmitted to an object under examination, e.g., a body, after being steered and focused. Ultrasonic echoes reflected from various internal portions of the body or organs are received by the transducer and are thereafter converted into ultrasonic beam signals. These signals are processed by the known circuits so as to display tomographic images of the desired internal portions of the body. To obtain such ultrasonic images of the body, it is necessary to scan the ultrasonic beams toward the inside portions of the body.

Various scanning systems have been proposed; typically, a mechanical scanning system, a linear scanning system, and a sector scanning system.

In the linear scanning system, the transducer is constructed with a plurality of transducer elements arranged in an array. These elements are electrically divided into plural sub-groups. During the beam transmission, the transducer element sub-groups are sequentially excited and the ultrasonic beams are scanned while steering and focusing the ultrasonic beams are controlled by giving predetermined delay times to the exciting signals.

The conventional delay mechanism employs the analogue delay lines having a number of coils and capacitors, with various types of switching mechanism for selectively switching these delay lines. The delay lines are so-called "analogue delay lines."

Another conventional delay mechanism is known from, e.g., U.S. Pat. No. 4,290,310 to Anderson issued on Sept. 22, 1981, which discloses the digital control and memory means for both steering and focusing of the transmitter and receiver portions.

It is an object of the present invention to realize highly precise delay times for steering and focusing the ultrasonic beams by introducing a digital control technique.

It is a further object of the present invention to provide an ultrasonic imaging apparatus incorporating a digitally-operated delay circuit without employing higher frequency circuit elements.

SUMMARY OF THE INVENTION

These objects may be accomplished by providing an ultrasonic imaging apparatus comprising:

a transducer having a plurality of transducer elements arranged in an array, for transmitting ultrasonic beams toward an object under examination upon receipt of exciting pulses, and for receiving ultrasonic echoes reflected from the object, thereby producing echo signals;

a device for generating a reference signal;

a device for phase-shifting the reference signal so as to produce as a clock signal a plurality of reference signal trains each having a different phase from each other;

a timing control device for producing control data signals defined by an operation mode of the imaging apparatus;

a transmitter section having at least a plurality of digital delay devices connected to the phase shifting device, for digitally delaying one phase-shifted clock signal selected from the plurality of phase-shifted reference signals under the control of the timing control device, thereby producing the exciting pulses;

a receiver section connected to the transducer, for processing the echo signals under the control of the timing control device so as to produce an ultrasonic tomographic signal; and a device for displaying a tomographic image of the object based upon the ultrasonic tomographic signal.

BRIEF DESCRIPTION OF THE DRAWINGS

The invention is best understood by reference to the accompanying drawings, in which;

FIG. 5 shows a block diagram of an internal circuit of the digital delay circuit according to the second preferred embodiment.

DETAILED DESCRIPTION OF PREFERRED EMBODIMENTS

Figure 1:
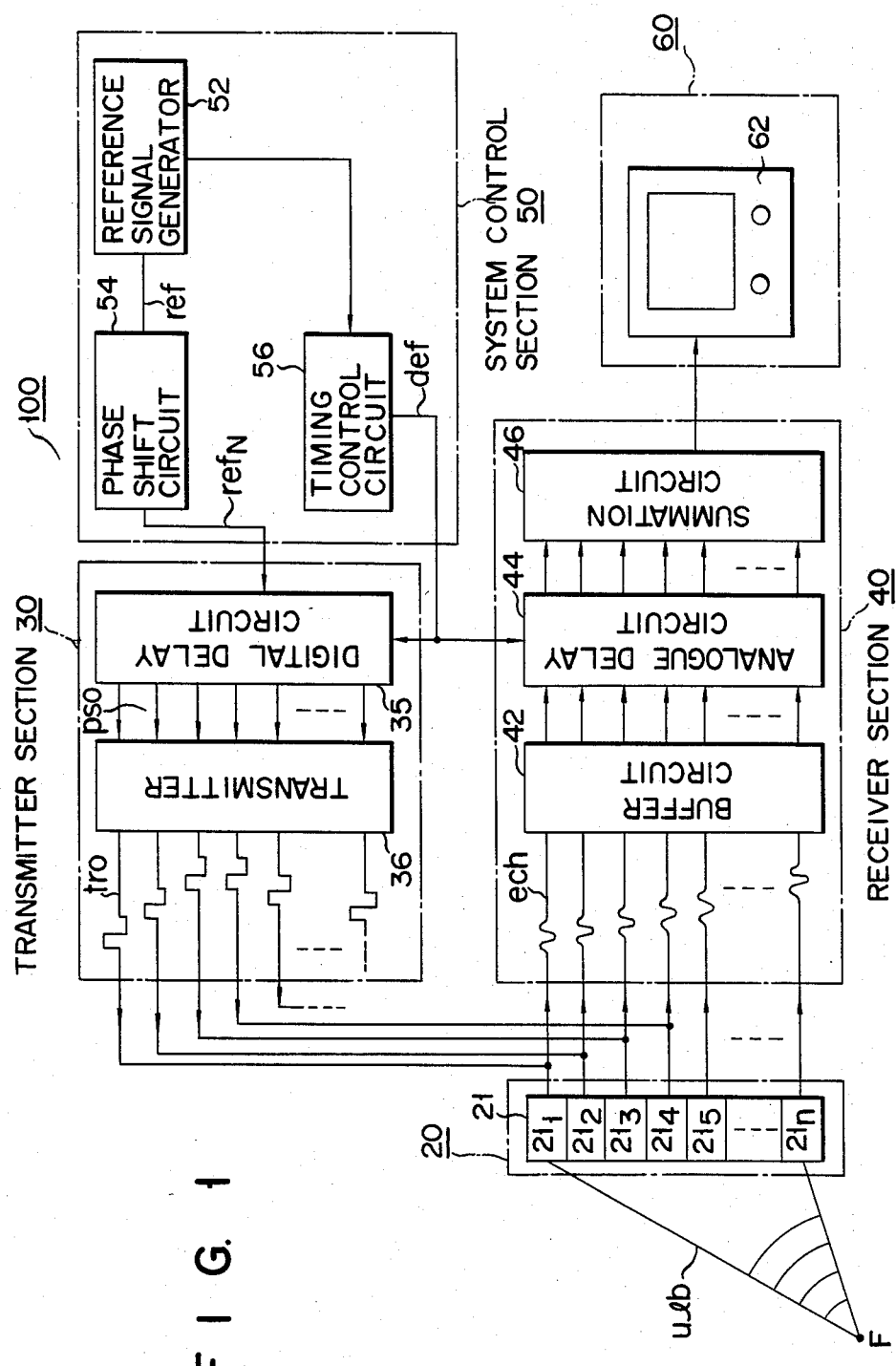
FIG. 1 shows a block diagram of an ultrasonic imaging apparatus according to one preferred embodiment.

Referring to FIG. 1, there is shown an ultrasonic imaging apparatus 100 according to a first preferred embodiment. The ultrasonic imaging apparatus 100 is composed of main five sections; a transducer section 20, a transmitter section 30, a receiver section 40, a system control section 50, and a display section 60.

The transducer section 20 includes an array type transducer 21 having a plurality of transducer elements $21_1, 21_2, \ldots 21_n$ (n is the number of the elements).

The system control section 50 includes a reference signal generator 52, a phase shift circuit 54, and a timing control circuit 56. The reference signal is used as a clock pulse. A digital delay circuit 35 is provided in the transmitter section 30. The digital delay circuit 32 delays the clock signal $ref_N$ by a delay time that is determined in relation to the delay time control signal def, so that the delayed reference signal is supplied to the transmitter 36 or pulser. This clock signal $ref_N$ is derived from the phase shift circuit 54.

When the transducer 21 is operated under the sector scanning mode, all of the transducer elements $21_1, 21_2, 21_3, \ldots 21_n$ must be simultaneously excited by the exciting pulses tro having predetermined delay times that are determined by the beam transmission direction and the focal point F. These exciting pulses tro having the predetermined delay times are generated in such a way that the selected reference signals $ref_N$ are delayed under the control of the timing control circuit 56. The delay times of the digital delay circuit 35 are defined by the delay time control signal def derived from the timing control circuit 56. In other words, the respective transducer elements $21_1, 21_2, 21_3, \ldots 21_n$ are excited by the n numbers of exciting pulses having individual delay times that are determined on the bases of the delay time control signals def. Accordingly, the n number of delay time units are contained in this digital delay circuit 35, the n numbers being identical to pieces of the transducer elements $21_1, 21_2, \ldots 21_n$.

The transmitter or pulser 36 is connected to the digital delay circuit 35, which is electrically sub-divided into the n numbers of signal paths. Upon receipt of the delayed reference signals pso from the delay circuit 35, the transmitter 36 produces either the exciting pulses for the burst drive mode (i.e., plural wave numbers), or those for the unit pulse drive mode (i.e., single wave number). The above-described transmitter section 30 is composed of the digital delay circuit 35 and the transmitter 36.

A plurality of ultrasonic beams ulb are transmitted from the transducer 21 to the focal point F where an object under examination such as a body is located. The ultrasonic echoes are reflected from the object and then received by the same transducer 21. The n numbers of echo signals ech are derived from the transducer elements $21_1, 21_2, \ldots 21_n$. The receiver section 40 is connected to receive these echo signals from the transducer 21. The receiver section 40 is composed of the preamplifier 42 having the buffer function, the analogue delay circuit 44, and the summation circuit 46. As the functions of these circuits are well known, a simple explanation will now be given. The echo signals are amplified in the buffer circuit or preamplifier 42, and thereafter delayed in the analogue delay circuit 44 constructed by the normal IC delay lines (not shown in detail). The delay times of the analogue delay circuit 44 are controlled by the same delay time control signal def of the timing control circuit 56. The resultant delayed echo signals are summed in the summation circuit 46 so as to produce the ultrasonic image signals of the object. The ultrasonic image signals are then supplied to a TV monitor 62 of the display section 60 by which the ultrasonic images of the object are visualized after the ultrasonic image signals are processed by, e.g., a digital scan converter (not shown) of the TV monitor 62.

Specifically, a major circuit arrangement of the ultrasonic imaging apparatus 100 will now be described in more detail with reference to FIG. 2. This major circuit arrangement is constructed by the transducer section 20, transmitter section 30, receiver section 40 and system control section 50. In order to provide a better understanding of the present invention, a detailed description will be made of particularly the digital delay circuit 35 and system control section 50.

Figure 2:
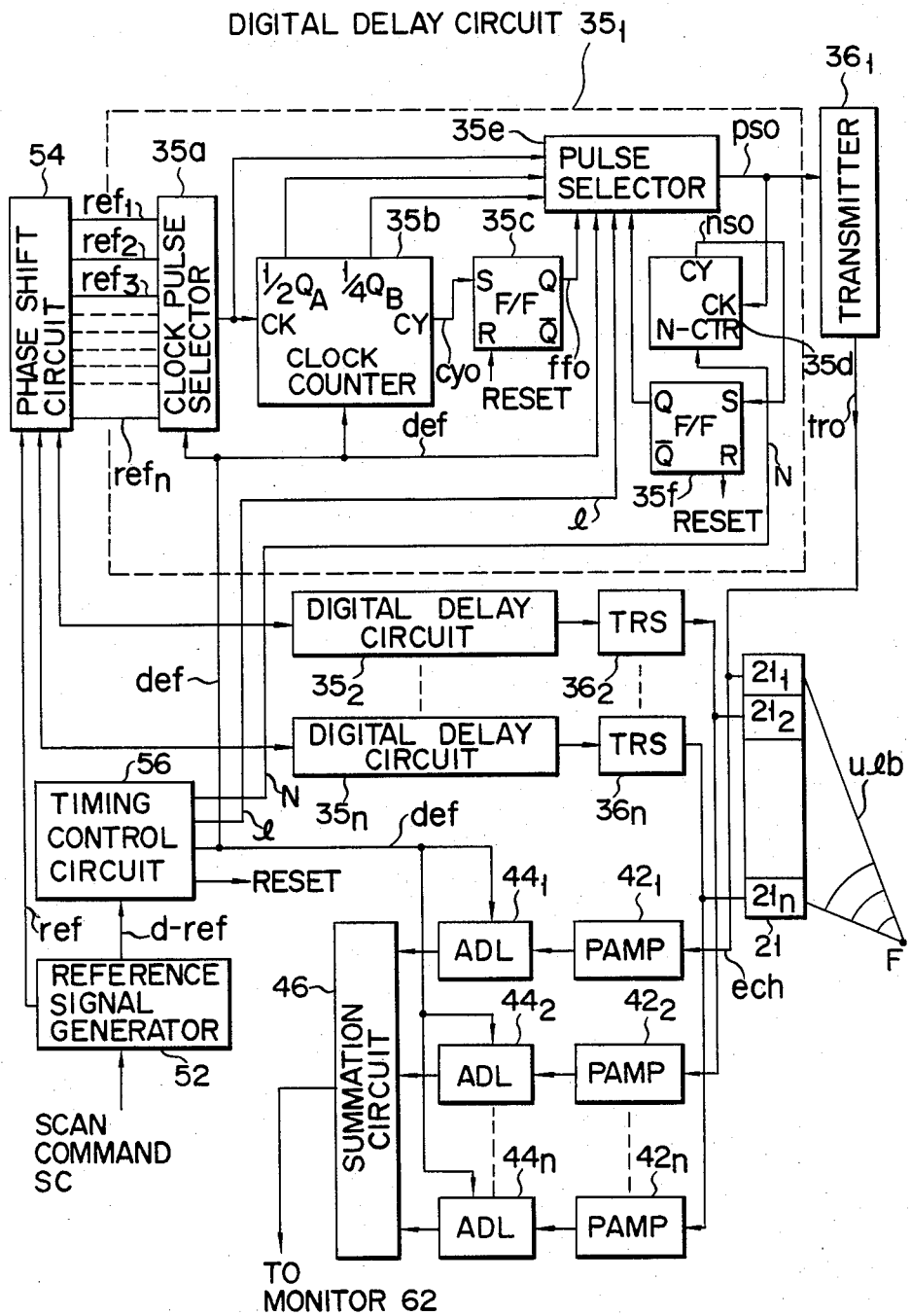
FIG. 2 shows a block diagram of an internal circuit of the digital delay circuit of FIG. 1 and the relevant circuits.

Referring to FIG. 2, a detailed construction is shown. It should be noted that the following explanation may involve the same description made in FIG. 1, and only one digital delay circuit $35_1$ is shown and the remaining delay circuits $35_1, 35_2, \ldots 35_n$ are indicated as blank boxes. The transducer 21 includes the n numbers of transducer elements $21_1, 21_2, \ldots 21_n$, and is of the array type. The reference signal generator 52 of the system control section 50 produces the reference signal (i.e., the clock pulse) ref. The timing control circuit 56 controls the entire system of the imaging apparatus 100. The phase shift circuit 54 receives the reference clock signal ref and outputs a number of reference clock signal trains $ref_1, ref_2, \ldots ref_n$ whose phases are equally shifted by a phase difference $\Delta t$ (i.e., the multi-phase shift operation, FIG. 3).

The digital delay circuit 35 is connected to the phase shift circuit 54. The digital delay circuit 35 is composed of the n numbers of the digital delay sub-circuits $35_1, 35_2, \ldots 35_n$. All of the digital delay circuits $35_1, 35_2, \ldots 35_n$ are connected parallel to each other and to one phase shift circuit 54. For brevity, the first delay circuit $35_1$ is connected to the phase shift circuit 54. A typical operation of the digital delay circuit 35 is as follows. The multiphase shifted reference signals $ref_1, ref_2, \ldots ref_n$ are selected to be one desirable reference signal $ref_N$ in response to a control signal derived from the timing control circuit 56. Furthermore the digital delay circuit 35 counts the ratio of frequency division, the delay time and the wave number of the selected reference clock signal based upon various control data signals of the wave number N, frequency dividing ratio l and delay time f. These control data signals are fed from the timing control circuit 56.

Similarly, the n numbers of the transmitters $36_1, 36_2, \ldots 36_n$ are connected to the corresponding digital delay circuits $35_1, 35_2, \ldots 35_n$. The outputs of the n numbers of the transmitters $36_1, 36_2, \ldots 36_n$ are connected to the respective transducer elements $21_1, 21_2, \ldots 21_n$ of the transducer 21. Accordingly, each of the transducer elements is activated by the individual exciting pulses derived from the corresponding digital delay circuits so as to produce the predetermined ultrasonic beams adapted to the selected scanning mode.

Since the internal circuits of the n numbers of the digital delay circuits $35_1, 35_2, \ldots 35_n$ are identical to each other, the internal circuit of the first digital delay circuit $35_1$ will now be typically described.

Referring back to FIG. 2, the first digital delay circuit $35_1$ is composed of a clock pulse selector 35a, a clock counter 35b, a first RS flip-flop 35c, a wave number counter 35d, a pulse selector 35e, and a second RS flip-flop 35f. The clock pulse selector 35a selects one desirable phase-shifted reference (clock) signal from the n numbers of the phase-shifted reference signals that have been produced from the phase shift circuit 54. This selection is accomplished by receiving the control signal def from the timing control circuit 56. The pulse numbers of the selected clock signal $ref_1$, for example, are counted by the clock counter 35b. This selected clock signal is also fed to the pulse selector 35e. The clock counter 35b is of the preset type and is presetable by the control signal, i.e., the delay time data signal def. The clock counter 35b has two output terminals $\frac{1}{2}Q_A$ and $\frac{1}{4}Q_B$, and a carry output terminal CY. From the carry output terminal CY, the carry signal cyo is delivered to the set terminal of the first RS flip-flop 35c when the count value of the clock counter 35b reaches the preset value. A first clock pulse having a half of the frequency of the selected clock pulse $ref_1$ is derived from the terminal $\frac{1}{2}Q_A$, and a second clock pulse having one fourth of the frequency of the selected clock pulse $ref_1$ is derived from the terminal $\frac{1}{4}Q_B$. Since such a frequency divider function is provided with the clock counter 35b, more precise frequency adjustment can be realized for the original reference signal ref. The output of the first RS flip-flop 35c is supplied to the pulse selector 35e. Thus the pulse selector 35e receives as the input clock pulse the selected clock pulse $ref_1$, the $\frac{1}{2}$-frequency divided clock pulse, and also as the control data the carry signal ffo of the RS flip-flop 35c, the delay time data signal def, the ratio of frequency division data signal l, and an output of a second RS flip-flop 35f. The pulse selector 35e operates as follows. Upon receipt of the frequency division ratio l, the correct clock pulse pso is selected from those clock pulses of the output terminals $\frac{1}{2}Q_A$ and $\frac{1}{4}Q_B$. This correct clock pulse pso is delivered to the first transmitter $36_1$ in synchronism with the selected clock pulse $ref_1$ by opening the gate of the pulse selector 35e when the carry output signal ffo of the first RS flip-flop 35c is delivered thereto. The above gate of the pulse selector 35e is closed by the output signal of the second RS flip-flop 35f which is set by the wave number counter 35d. The wave number counter 35d receives the clock pulse pso derived from the pulse selector 35e, and also the wave number data N from the timing control circuit 56. The carry output of the wave number counter 35d is fed to the set terminal of the second R/S flip-flop 35f.

Next, the receiver section 40 will be simply described.

The n numbers of the preamplifiers $42_1$, $42_2$, ... $42_n$ are coupled to the corresponding transducer elements $21_1$, $21_2$, ... $21_n$ so as to amplify the echo signals. The same numbers of the analogue type delay lines $44_1$, $44_2$, ... $44_n$ are connected to the respective preamplifiers $42_1$, $44_2$, ... $42_n$. The delay time for these delay lines $44_1$, $44_2$, ... $44_n$ is controlled by processing the aforementioned delay control data signal def in the suitable manner. The delay lines $44_1$, $44_2$, ... $44_n$ are connected to the summation circuit 46. The summation circuit 46 is connected to the TV monitor 62.

A console table (not shown) is provided with the imaging apparatus 100. The console table is operated by user to select the pulse drive mode or the burst drive mode. Upon selecting the drive mode of the transducer 21, the control data signals for, e.g., the wave number N and the ratio of frequency division l are generated from the console table. These control signals are determined in the console table by taking account of the transducer's specification, the scanning mode, the resonant frequency of the transducer, and the drive mode, etc.

Figure 3:
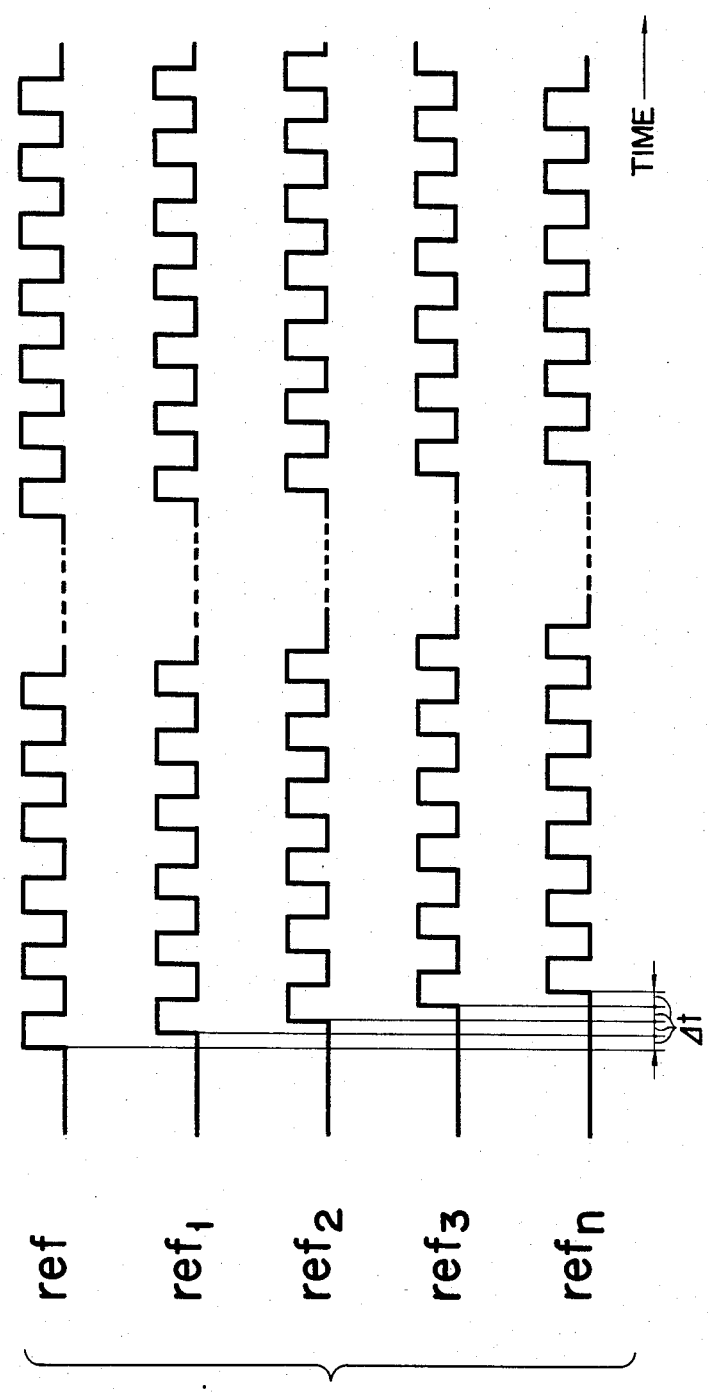
FIG. 3 is a waveform chart of the reference signal and the phase-shifted reference signals.
Figure 4:
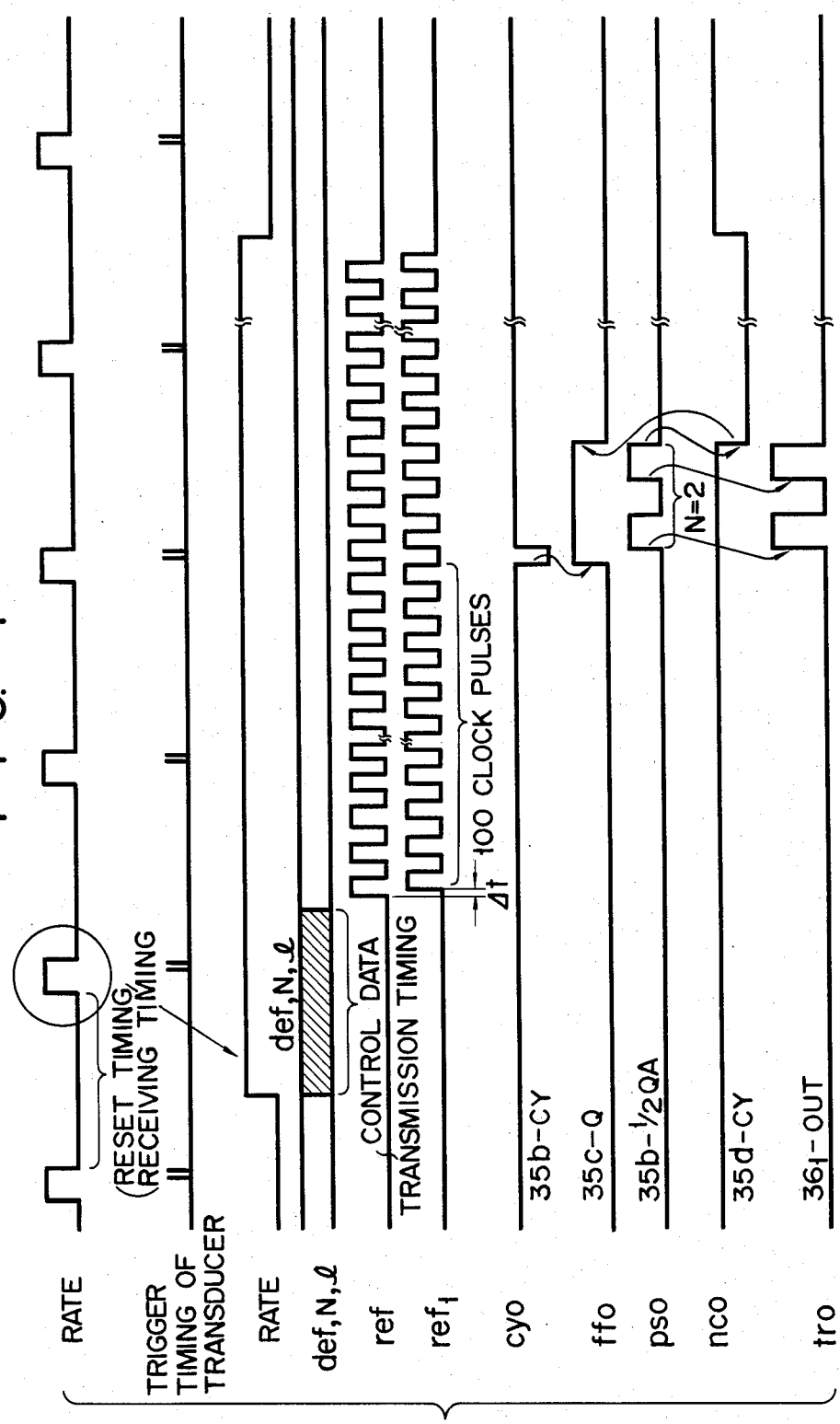
FIG. 4 is a timing chart of the digital delay circuit shown in FIG. 2.

Operations of the ultrasonic imaging apparatus 100 will now be described in detail with reference to FIGS. 3 and 4.

As an initial condition such as the scanning mode, e.g., the sector scan in this embodiment, the drive mode and the clock frequency adapted to the transducer is set by user on the console table, and thus suitable control data, e.g., the wave number N, the ratio of frequency division l, and the delay time def are produced from the timing control circuit 56. Thereafter when the user instructs through the console table the scan command SC, the original reference signal having the predetermined clock frequency is generated from the reference signal generator 52. This reference signal is fed to the phase shift circuit 54. By phase-shifting this original reference signal ref under the predetermined shift amount $\Delta t$, the n numbers of the reference (clock) signals $ref_1$, $ref_2$, ... $ref_n$ are produced in the phase shift circuit 54 (see FIG. 3). In this embodiment, this shift amount $\Delta t$ is selected to be equal for all of the phase-shifted reference signals $ref_1$, $ref_2$, ... $ref_n$. These phase-shifted reference signals are coupled to the clock pulse selector 35a.

In the meantime, the original reference signal ref is frequency-divided in the reference signal generator 52 so as to obtain a given transmission interval for the ultrasonic beam. Thus, a frequency-divided reference signal d-ref is supplied to the timing control circuit 56.

Every time the frequency-divided reference signal d-ref is received by the timing control circuit 56, the delay control signals def are produced. The delay control signals are determined based upon the preset conditions, i.e., the steering direction, the depth of focus (focal point F). These delay control signals def are separately determined so as to give the desirable delay times to the respective transducer elements $21_1$, $21_2$, ... $21_n$, whereby the ultrasonic beams can be transmitted at the desirable steering angle and focus depth. For the sake of illustration, only the control signals N, l, and def for the first digital delay circuit $35_1$ are indicated in the circuit diagram of FIG. 3.

As one of these control signals def is fed to the respective digital delay circuits $35_1$, $35_2$, ... $35_n$, the delay time controls are independently effected therein. In response to the delay control signal def of the timing control circuit 56, the clock pulse selector 35a selects one phase-shifted clock (reference) signal $ref_N$ from the phase-shifted clock signals $ref_1$, $ref_2$, ... $ref_n$, and simultaneously the clock counter 35b is preset so as to obtain the desirable delay time in the digital form. Assuming that the first phase-shifted clock signal $ref_1$ is selected for the first digital delay circuit $35_1$ in this embodiment, the clock signal $ref_1$ selected by the clock pulse selector 35a is supplied directly to the pulse selector 35e and also to it through the clock counter 35b by which the frequency of this clock signal is divided into $\frac{1}{2}$ and $\frac{1}{4}$ for example.

Also, assuming that the wave number N is selected to be 2 in this embodiment, the wave number counter 35d is preset at N=2. The control signal l for the frequency division ratio is supplied to the pulse selector 35e, whereby the frequency-divided clock signals of the clock counter 35b are selected. A frequency of the original reference signal ref is selected to be 10 MHz.

Upon receipt of the selected clock signal $ref_1$ the clock counter 35b starts counting from a value determined by the preset input number that is supplied by the console table (not shown). When the count value reaches the preset value, e.g., 100 pulses (0.1 $\mu s \times 100 = 10$ $\mu s$), the clock counter 35b derives the carry output signal cyo (see FIG. 4). Since this carry output signal cyo is delivered to the set terminal of the first RS flip-flop 35c, then it is set and the output signal ffo is produced from its output terminal Q (see FIG. 4). This output signal ffo is supplied as the gate control signal to the pulse selector 35e. When the pulse selector 35e receives the gate control signal ffo, the gate of the selector 35e is opened to derive the selected clock pulse pso, e.g., the clock pulse from the output $\frac{1}{2}Q_A$ (see FIG. 4). This clock pulse $\frac{1}{2}Q_A$ is output in synchronism with the phase-shifted clock signal $ref_1$.

In the meanwhile, the selected clock signal pso of the pulse selector 35e is also supplied to the clock terminal of the wave number counter 35d. The wave number counter 35d starts counting the clock signal pso. When the counter 35d reaches the preset value, e.g., N=2(two pulses), it produces the carry output signal pso (see FIG. 4). The carry output signal pso is supplied to the set terminal of the second RS flip-flop 35f. As the output signal of this flip-flop 35f is fed to the pulse selector 35e, the gate of the pulse selector 35e is closed so that the clock pulse pso is no longer applied to the transmitter $36_1$.

In summary, the typical digital delay operation will now be described more in detail with reference to FIGS. 2 and 4. The clock (reference) signal frequency is 10 MHz. The wave number N is selected to be 2, and the desirable delay time for the first delay circuit $35_1$ is 10.02 microseconds ($\mu s$). Assuming that 5 phase-shifted clock signals $ref_1$, $ref_2$, ... $ref_5$ are produced from the phase shift circuit 54, the amount of the phase shift $\Delta t$ is 20 ns, and the pulse width of each of the phase-shifted clock pulses ref$_1$, ref$_2$, ... ref$_5$ has 100 ns or 0.1 μs.

For the first delay circuit 35$_1$, the first phase-shifted clock signal ref$_1$ having the phase shift amount of 20 ns with respect to the original reference signal is selected by the clock pulse selector 35a based upon the delay control signal def. Since the pulse width, or period of this phase-shifted clock signal ref$_1$ is 0.1 μs, the carry output signal cyo is produced in the clock counter 35b when the 100 pieces (numbers) of the first phase-shifted clock signal ref$_1$ are counted, i.e., 0.1 μs×100=10 μs. Upon receipt of the carry output signal cyo the pulse selector 35e starts to deliver the first phase-shifted clock pulse ref$_1$ to the transmitter 36$_1$. Accordingly, this first phase-shifted clock pulse ref$_1$ thus applied to the transmitter 36$_1$ is delayed by 10.02 μs from the original reference signal ref. The same operation is carried out for the succeeding digital delay circuits 35$_2$, 35$_3$, ... 35$_n$ by properly selecting the desirable delay times (i.e., the clock pulse numbers) and also the desirable phase-shifted clock signals (i.e., the amount of the phase shift).

The resultant clock signal pso is supplied to the corresponding transmitter or pulse 36$_{21}$, so that it is converted into the exciting pulse tro. The exciting pulse tro is then applied to the given transducer element 21$_1$ of the transducer 21. The same clock pulse generation as the above first transmitter channel is achieved under the control of the timing control circuit 56. As a result, all of the transducer elements 21$_1$, 21$_2$, ... 21$_n$ are activated by the predetermined exciting pulses, so that the ultrasonic beam is transmitted toward the object at the given steering (transmission) direction and focus depth that have been preset by the user through the console table.

After the ultrasonic beams are projected toward the object located at the focal point F, the echoes reflected from the internal portions and boundaries of the object are received by the same transducer 21. The transducer 21 converts the reflected echoes into the echo signals that are amplified in the corresponding preamplifier circuits 42$_1$, 42$_2$, ... 42$_n$, are delayed in the corresponding analogue delay lines 44$_1$, 44$_2$, ... 44$_n$, and are finally summed in the summation circuit 46. Thus, the summed echo signal is supplied to the TV monitor 62, whereby the ultrasonic tomographic image of the scanned object can be monitored.

During the scanning operation, the reference signal d-ref that has been frequency-divided in the reference signal generator 52 is supplied to the timing control circuit 56 at a given time interval, so that the above-described generation of the exciting pulses are repeated in synchronism with the frequency-divided reference signal d-ref. Before the commencement of the individual pulse generation period, both the count values of the clock counter 35b and the wave number counter 35d are cleared and also both the flip-flops 35c and 35f are reset by the timing control circuit 56.

As having been described above, a plurality of ultrasonic beams are sequentially transmitted from the transducer 21 to the object in accordance with the sector scanning mode to obtain the ultrasonic two-dimensional tomographic image of the object in the sector scanning mode.

A detailed description of the delay time data signal def will now be made.

The amount of the digital delay time "DT" according to the invention is calculated by the following equation 1:

$$DT = T \cdot f_{MSB} + \Delta t \cdot f_{LSB} \quad (1),$$

where

"T" indicates a period of the reference (clock) signal ref;

"$f_{MSB}$" and "$f_{LSB}$" denote the most significant bit and least significant bit of the digital delay time data signal def (e.g., 7 bits ($f_{MSB}$) for the clock counter 35b, and 3 bits ($f_{LSB}$) for the pulse selector 35a); and "Δt" indicates the amount of the phase shift with respect to the original reference signal ref.

It should be noted that the digital delay time data signal def is composed of 11 bits. The 7 and 3-bit data signals have just been described, and the remaining 1-bit data signal is used to control the gating operation of the pulse selector 35e for the selected clock signal pso.

The results of the experiment of the imaging apparatus 100 is given as follows. When the oscillating frequency of the original reference (clock) signal ref was 10 MHZ, the period "T" was 100 ns, and when it was 15 MHZ, the period "T" was approximately 66.6 ns. In both cases, the optimum quantization could be realized by setting the phase shift amount Δt to be 20 ns. The digital delay circuit 35 is available from SWCC (the manufacturer) as the model No. TQS-100, and the remaining circuit elements are commercially available TOSHIBA's gate array:TC15G022P. In accordance with the present invention, if the wave number is selected to be 1, then the pulse drive mode of the transducer 21 is realized, and if selected to be more than 1, then the burst drive mode is achieved. Since the present transducers have various own exciting frequencies, they can be excited under the optimum condition for all of the drive modes by properly selecting the wave number N, the pulse width, the pulse period T and so on.

As is well known, according to the burst drive mode of the transducer, a plurality of exciting pulses are applied during one beam transmission, so that the transmission power can be increased, resulting in a large echo signal level. Specifically, when the wave number N is selected to be 2, a signal-to-noise ratio can be improved without degrading the distance resolution according to the present invention. As a result, such a burst drive mode is suitable for obtaining the bloodflow pattern information on the basis of the Doppler effect.

In summary, the digital delay circuit 35 according to the first embodiment can, first, select the phase-shifted clock signal suitable for the instructed scanning conditions from a plurality of the phase-shifted clock signals ref$_1$, ref$_2$, ... ref$_n$, and second, can give the predetermined delay time to the selected clock signal. Accordingly, such a time delay operation can be accomplished without limitations caused by only the timing of the original reference signal. In other words, to adapt the imaging apparatus 100 to all of the desirable scanning conditions such as the scanning mode, the drive mode, and the clock signal frequency, the suitable clock signal can be available from a number of the phase-shifted clock signals ref$_1$, ref$_2$, ... ref$_n$.

Moreover, the frequency adjustment and the wave number selection can be freely achieved by utilizing the control data signals 1 and N.

In the conventional imaging apparatus, the transducer elements were activated by the exciting pulses of the sine wave generated in the resonant circuit. To the contrary, as the transducer elements are excited by the rectangular pulses according to the invention, the optimum element drive can be realized.

Since the phase shift operation and pulse selection to the original reference signal can be effected, and also the desirable delay time can be obtained by counting the selected pulse signal, delay time precision of the digital delay circuit can be improved even if electronic circuit elements operable only at low frequencies are employed.

According to the present invention, it is obvious that various modifications can be conceived. For example, first when the wave number N is selected to be 1 (i.e., the pulse drive mode of the transducer 21), a simple combination of only the clock pulse selector 35a, a clock counter, and a wave counter 35 can be realized so as to establish the foundamental operation, i.e., the digital delay operation of the present invention.

Second, when the wave number N is selected to be more than 2 (i.e., the burst drive mode), it is also possible to omit the frequency-divided clock signals of the clock counter 35b. That is, only the selected clock signal of the clock pulse selector 35a can be directly supplied to the pulse selector 35e. In response to the control data signal, thus the supplied clock signal can be supplied therefrom to the corresponding transmitter 36.

For the above second and third embodiments, a digital delay circuit can be realized as shown in FIG. 5. In this circuit, the selected phase-shifted clock signal $ref_N$ is directly supplied to a clock counter 35g. The clock counter 35g can hold the selected phase-shifted clock signal $ref_N$ until the count value reaches the preset value, e.g., N=1 or 2 defined by the delay control signal def. Accordingly, when the pulse numbers of the selected phase-shifted clock signal $ref_N$ are equal to the preset value of the clock counter 35g, the clock counter 35g starts to deliver the digitally-delayed phase-shifted clock signal pso to the transmitter $36_1$ and also the wave number counter 35h. Subsequently, when the counter value of the wave number counter 35h reaches the preset value, e.g., N=2, the output signal nso is supplied to the clock counter 35g. As a result, upon receipt of the output signal nso the clock counter 35g stops to deliver the above digitally-delayed clock signal pso to the transmitter $36_1$.

Third, it is alternatively possible that the pulse selector 35e is controlled by the 1-bit delay time data signal so as to excite the transducer elements $21_1, 21_2, \ldots 21_n$ by way of the variable aperture method. Since the variable aperture method is known in the art, further details regarding this method is omitted.

Further, as the S/N of the system is one of the major factors in the Doppler type imaging apparatus, the following operation conditions are preferable. The wave number N is selected to be more than 2, and the central frequency of the frequency spectrum of the ultrasonic beam is set to be high, though the band width may be narrow.

In the console table not shown in the drawings, the central processing unit and random access memories may be provided from which a given program is read out, thereby producing the delay time data, wave number and the other necessary data.

Finally, if the carry output signal nso of the wave number counter 35d is supplied as a reset signal to the reset terminal of the first RS filp-flop 35c, the second RS flip-flop 35f may be omitted.

While the invention has been described in terms of certain preferred embodiments, and exemplified with respect thereto, those skilled in the art will readily appreciate that various modifications, changes, omissions, and substitutions may be made without departing from the spirit of the invention.

For instance, not only the sector scan but also the linear scan and other scans can be introduced into the imaging apparatus according to the invention.

The ultrasonic imaging apparatus may be utilized in not only such a medical field, but also the industrial measurment field.

What is claimed is:

1. An ultrasonic imaging apparatus comprising:
   transducer means having a plurality of transducer elements for transmitting ultrasonic pulses along a beam to an object and receiving ultrasonic echoes from the object to produce echo signals;
   transmitter means for exciting said elements at different delayed timings to steer or focus said beam, said transmitter means including a clock pulse generator for generating a train of clock pulses;
   phase-shifting means for shifting the phase of the train of clock pulses generated by the clock pulse generator of said transmitter means, thereby producing a plurality of reference pulse trains having different phases;
   clock pulse selector for independently selecting one of said reference pulse trains, the phase difference in time of which is the nearest to the remainder of said delayed timing divided by the period of the clock pulse;
   a plurality of pulse counters connected to said pulse selectors for counting the reference pulse trains selected by said pulse selectors until reaching the preset value nearest to said delayed timing to produce a trigger pulse;
   pulsers connected to said transducer elements and said pulse counters for producing, in response to the trigger pulse, a drive pulse to excite the transducer elements;
   scanning means for achieving a two-dimensional scanning of the object by using said beam;
   receiving means connected to said transducer means for processing the echo signals to produce a video signal representing the image of the object; and
   display means for displaying the image of the object by using the video signal.

2. An apparatus according to claim 1, wherein said transducer means further includes a wave number counter for counting the number of waves of the trigger pulses generated by said pulse counters.

3. An apparatus according to claim 1, wherein said trigger pulses have the same frequency as said clock pulses.

4. An apparatus according to claim 1, wherein each of said pulse counters includes frequency dividing means for dividing the reference pulse train to produce a divided reference pulse train, said trigger pulses having the same frequency as said frequency-divided pulse train.

* * * * *